(12) United States Patent
Lemarenko et al.

(10) Patent No.: US 10,156,653 B2
(45) Date of Patent: Dec. 18, 2018

(54) TECHNIQUES FOR REMOVING INTERFACE NOISE FROM ACOUSTIC LOG DATA

(71) Applicant: Schlumberger Technology Corporation, Sugar Land, TX (US)

(72) Inventors: Mikhail Lemarenko, Clamart (FR); Christoph Klieber, Clamart (FR); Thilo Michael Brill, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 107 days.

(21) Appl. No.: 15/348,279

(22) Filed: Nov. 10, 2016

(65) Prior Publication Data

US 2017/0176622 A1   Jun. 22, 2017

(30) Foreign Application Priority Data

Dec. 18, 2015 (EP) .................................. 15290325

(51) Int. Cl.
| | |
|---|---|
| *G01V 1/36* | (2006.01) |
| *G01V 1/40* | (2006.01) |
| *G01V 1/46* | (2006.01) |
| *G01V 1/50* | (2006.01) |
| *E21B 47/00* | (2012.01) |

(52) U.S. Cl.
CPC .................. *G01V 1/50* (2013.01); *G01V 1/36* (2013.01); *G01V 1/40* (2013.01); *G01V 1/46* (2013.01); *G01V 2210/1299* (2013.01); *G01V 2210/1429* (2013.01); *G01V 2210/32* (2013.01)

(58) Field of Classification Search
CPC ... G01V 1/50; G01V 1/40; G01V 1/44; G01V 1/36; G01V 2210/32; E21B 47/0005
USPC ............................................ 367/35; 181/105
See application file for complete search history.

(56) References Cited

U.S. PATENT DOCUMENTS

| | | | |
|---|---|---|---|
| 5,216,638 A | 6/1993 | Wright | |
| 5,274,604 A * | 12/1993 | D'Angelo | G01V 1/50 367/35 |
| 5,859,811 A | 1/1999 | Miller et al. | |
| 6,018,496 A * | 1/2000 | Stanke | E21B 47/0005 181/105 |

(Continued)

FOREIGN PATENT DOCUMENTS

GB          2504918 A  *  2/2014  ............... G01V 1/50

*Primary Examiner* — Ian J Lobo
(74) *Attorney, Agent, or Firm* — Michael Dae

(57) ABSTRACT

A method of determining properties of a wellbore in a formation includes obtaining from the acoustic logging tool, acoustic data comprising an acoustic wave reflected from the casing, the annular fill material, one or more interfaces between any of the mud, the casing, and the annular fill material, or combinations thereof. The method includes normalizing the acoustic wave in a frequency domain, resulting in a specular spectrum and removing spectral noise outside a region of interest in the specular spectrum. The method includes shaping the specular spectrum around a resonance frequency, converting the shaped specular spectrum into a time domain, resulting in a renormalized waveform, and subtracting from the renormalized waveform one or more of a specular noise, second interface echoes, resulting in a third interface echo signal.

19 Claims, 9 Drawing Sheets

(56) References Cited

U.S. PATENT DOCUMENTS

| | | | | |
|---|---|---|---|---|
| 6,483,777 B1* | 11/2002 | Zeroug | ............... | E21B 47/0005 367/35 |
| 2015/0218930 A1* | 8/2015 | Zeroug | ............... | E21B 47/0005 367/26 |
| 2015/0219780 A1* | 8/2015 | Zeroug | ............... | E21B 47/0005 702/6 |
| 2016/0061021 A1* | 3/2016 | Shaposhnikov | .... | E21B 47/0005 367/35 |
| 2016/0109604 A1* | 4/2016 | Zeroug | .................... | G01V 1/50 367/13 |
| 2016/0109605 A1* | 4/2016 | Bose | ........................ | G01V 1/50 367/35 |

\* cited by examiner

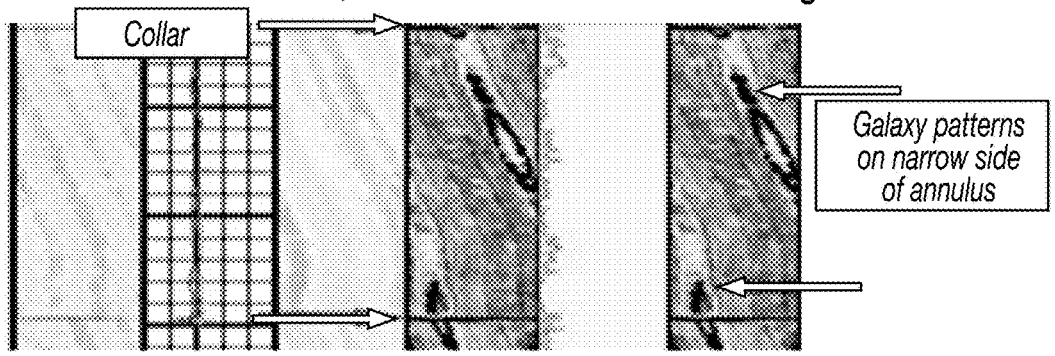
FIG. 3B (includes: "No centralizers, 4.5 in. liner inside 7 in. casing" and "3 centralizers/joint, 7 in. casing in open hole")
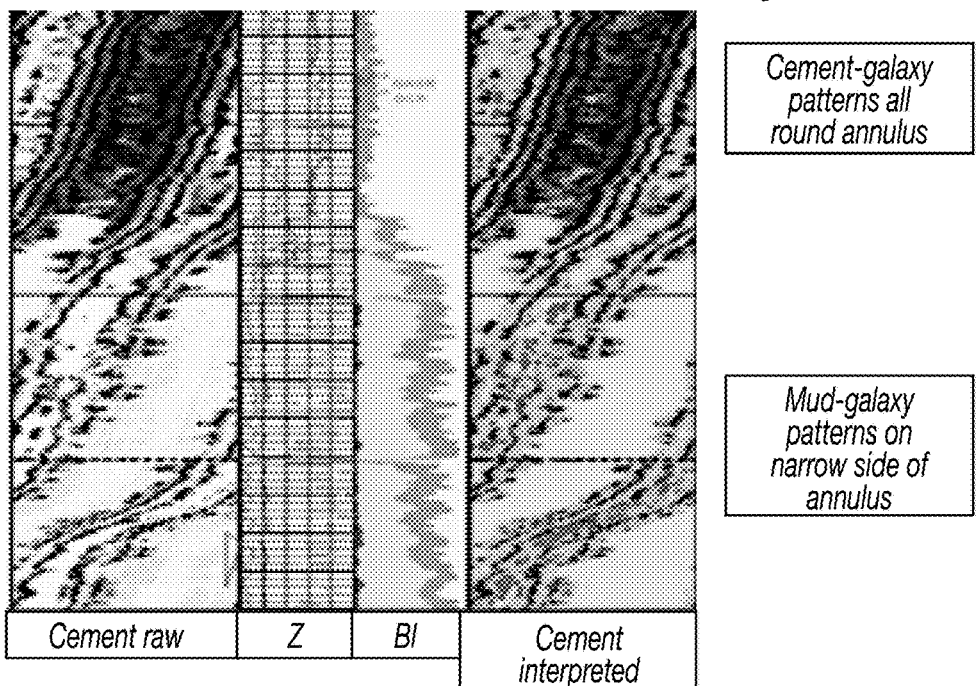
FIG. 3C — No centralizers, 8.625 in liner inside 10.75 casing

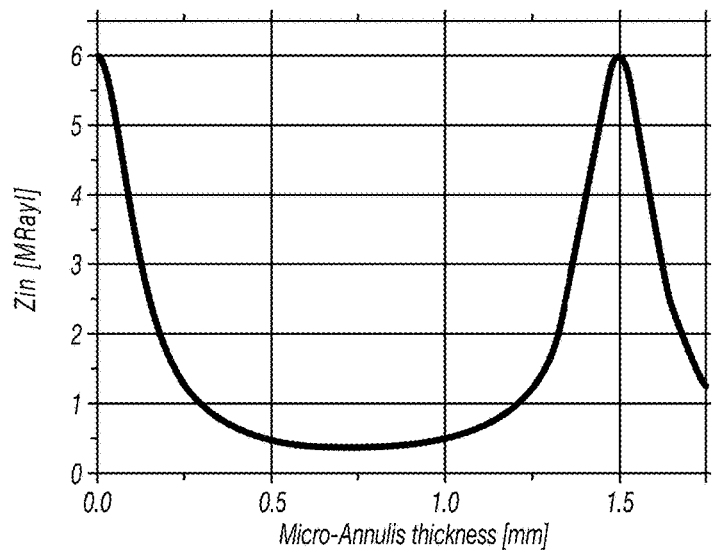
FIG. 5
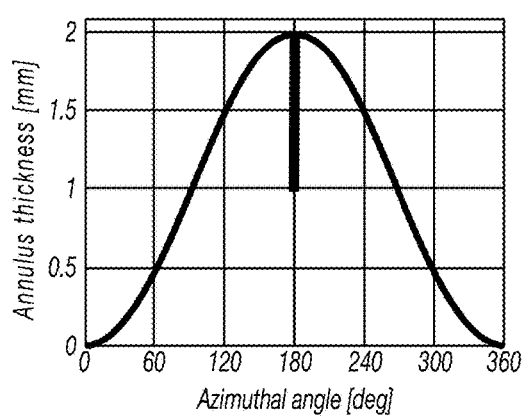 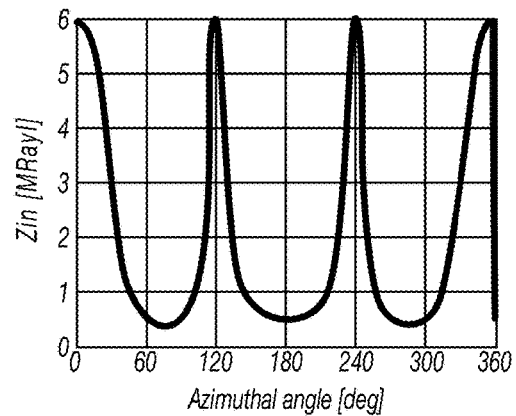
FIG. 6A　　　　　FIG. 6B

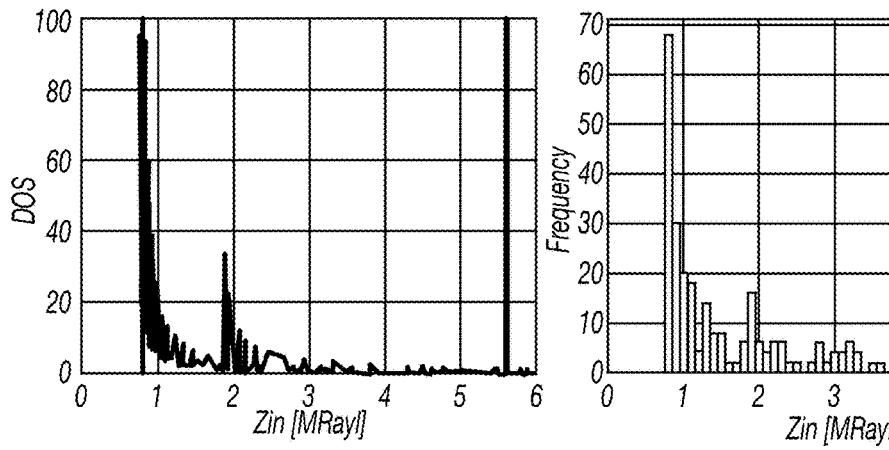
FIG. 11A  FIG. 11B
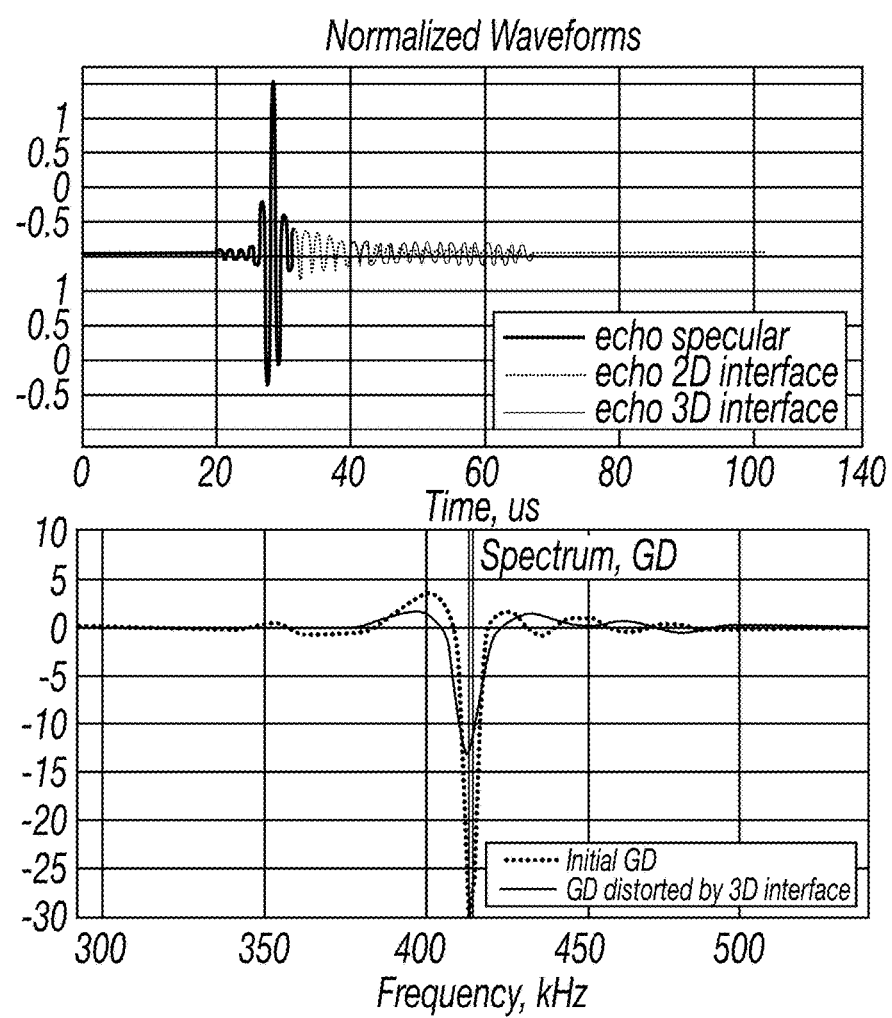
FIG. 12

TECHNIQUES FOR REMOVING INTERFACE NOISE FROM ACOUSTIC LOG DATA

CROSS-REFERENCE TO RELATED APPLICATIONS

The present invention claims the benefits of European Patent Application No. 15290325.8, filed on Dec. 18, 2015, titled "Techniques for Removing Interface Noise from Acoustic Log Data," the entire content of which is hereby incorporated by reference into the current application.

BACKGROUND

The present disclosure relates generally to acoustic measurements. In particular, the present disclosure relates to removing noise from the acoustic measurements.

This section is intended to introduce the reader to various aspects of art that may be related to various aspects of the present techniques, which are described and/or claimed below. This discussion is believed to be help provide the reader with background information to facilitate a better understanding of the various aspects of the present disclosure. Accordingly, it should be understood that these statements are to be read in this light, and not as admissions of prior art.

A wellbore may be drilled into a geological formation to extract oil and/or gas from the geological formation. Logging tools may determine a variety of characteristics of the wellbore and/or the geological formation. Logging tools may determine characteristics of the surrounding rock formation. Logging tools may also determine whether cement injected around the wellbore properly achieves zonal isolation. That is, to prevent the certain zones of the geological formation from interacting with one another within the wellbore and to prevent fluids from undesired zones entering the wellbore, the wellbore may be constructed by inserting a cylindrical casing into the wellbore and injecting the cement injected into an annulus between the casing and a wall of the wellbore (i.e., the geological formation). When the cement properly sets, fluids from one zone of the geological formation may be prevented from passing through the wellbore to interact with one another. However, the cement may not set as planned and/or the quality of the cement may be less than expected. Additionally, the cement may unexpectedly fail to set above a certain depth due to natural fissures in the geological formation.

A variety of acoustic (e.g., sonic or ultrasonic) tools may be used to verify that the cement is properly installed. These acoustic tools may produce and measure pulse acoustic waves or echoes through the wellbore to obtain acoustic cement evaluation data at various depths and azimuths in the wellbore. Acoustic waves may reflect from various layers and interfaces in a wellbore, including from the casing, the cement, the formation, or interfaces between these materials. Obtaining accurate measurements may sometimes be complicated when the received acoustic echoes include a superposition of several reflections originating from different layers and/or interfaces in the wellbore.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

In a first embodiment, a method of determining properties of a wellbore in a formation is disclosed. The wellbore comprises a casing and an annular fill material between the casing and the formation and mud between the casing and an acoustic logging tool. The method comprises obtaining from the acoustic logging tool, acoustic data comprising an acoustic wave reflected from the casing, the annular fill material, one or more interfaces between any of the mud, the casing, and the annular fill material, or their combinations. The method further comprises normalizing the acoustic wave in a frequency domain, resulting in a specular spectrum, removing spectral noise outside a region of interest in the specular spectrum, shaping the specular spectrum around a resonance frequency, converting the shaped specular spectrum into a time domain, resulting in a renormalized waveform; and subtracting from the renormalized waveform one or more of a specular noise, second interface echoes, resulting in a third interface echo signal.

In a second embodiment, this disclosure describes a non-transitory computer-readable medium storing computer-executable instructions, that when executed by at least one processor, causes the at least one processor to perform the following operations: obtaining from an acoustic logging tool, acoustic data comprising an acoustic wave reflected from a wellbore; normalizing the acoustic wave in a frequency domain, resulting in a specular spectrum; removing spectral noise outside a region of interest in the specular spectrum; shaping the specular spectrum around a resonance frequency; converting the shaped specular spectrum into a time domain, resulting in a renormalized waveform; and subtracting from the renormalized waveform one or more of a specular noise, second interface echoes, resulting in a third interface echo signal.

In a third embodiment, a system comprises an acoustic logging tool and a processor. The acoustic logging tool is configured to obtain acoustic data from a wellbore in a formation, the wellbore comprising a casing and an annular fill material between the casing and the formation and mud between the casing and the acoustic logging tool. The processor is configured to receive the acoustic data from the acoustic logging tool. The acoustic data comprises an acoustic wave reflected from the casing, the annular fill material, one or more interfaces between any of the mud, the casing, and the annular fill material, or their combinations. The processor is further configured to normalize the acoustic wave in a frequency domain, resulting in a specular spectrum; remove spectral noise outside a region of interest in the specular spectrum; shape the specular spectrum around a resonance frequency; convert the shaped specular spectrum into a time domain, resulting in a renormalized waveform; and subtract from the renormalized waveform one or more of a specular noise, second interface echoes, resulting in a third interface echo signal.

BRIEF DESCRIPTION OF THE DRAWINGS

Various aspects of this disclosure may be better understood upon reading the following detailed description and upon reference to the drawings in which:

FIG. 3B is another example of data recorded by the logging tool in accordance with another embodiment of the present disclosure;

FIG. 3C is a further example of data recorded by the logging tool in accordance with a further embodiment of the present disclosure;

FIG. 5 is a plot of an acoustic impedance as a function of micro-annulus thickness, in accordance with an embodiment of the present disclosure;

FIG. 6A is a plot of a annulus thickness as a function of azimuthal angle, in accordance with an embodiment of the present disclosure;

FIG. 6B is a plot of an acoustic impedance as a function of azimuthal angle, in accordance with an embodiment of the present disclosure;

FIG. 11A is an exemplary graph of density of states on a linear scale associated with the forward model of the simulated log in FIG. 10.

FIG. 11B is an exemplary histogram of acoustic impedance in states obtained from the simulated log of FIG. 10.

FIG. 12 is an example of a waveform polluted by a third interface (top) and the corresponding group delay notch in the presence of a third interface and without it (bottom).

DETAILED DESCRIPTION

Figure 1:
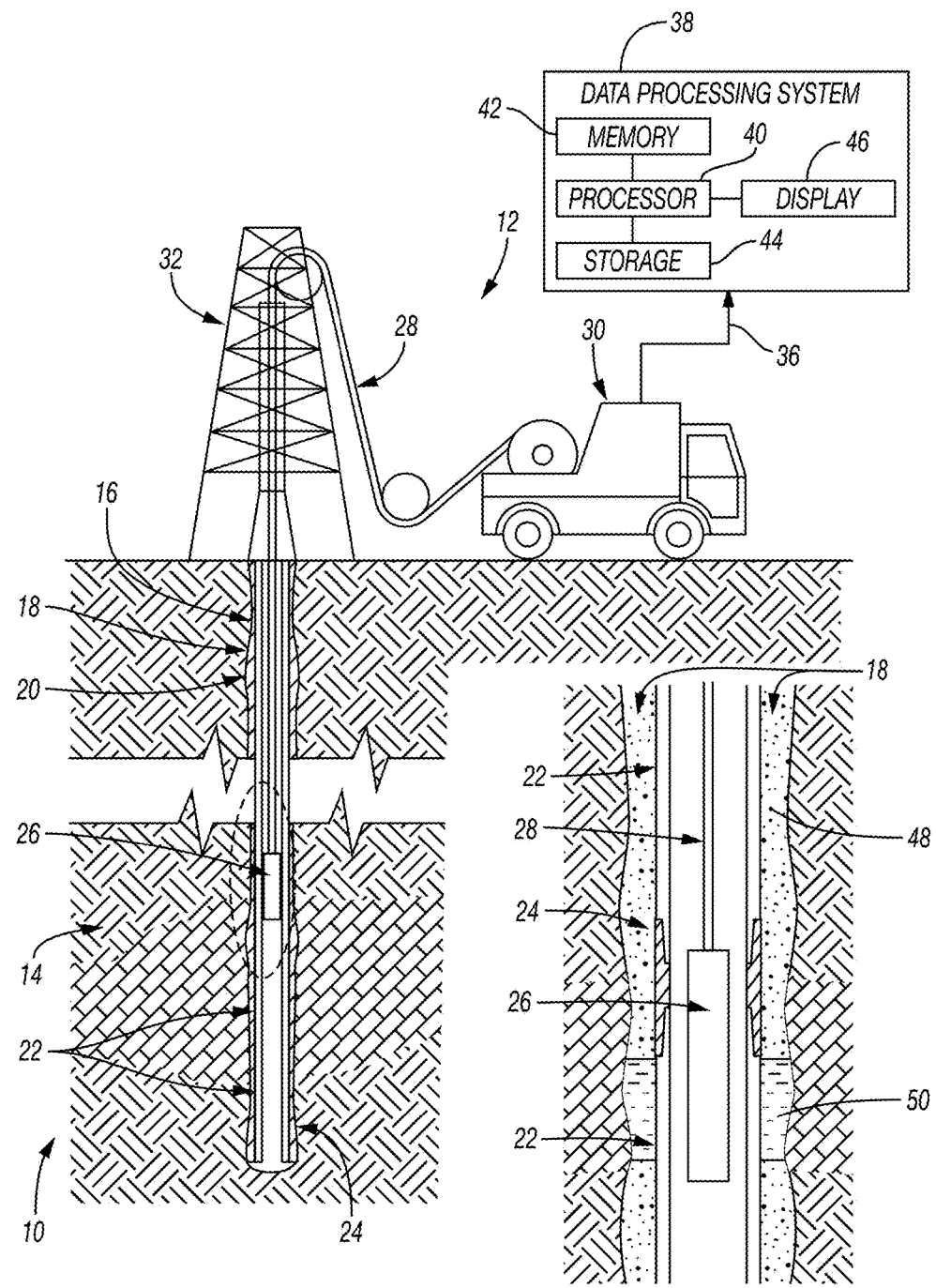
FIG. 1 is a schematic diagram of a system for measuring properties of a wellbore, formation, and/or a casing using a downhole logging tool, in accordance with an embodiment with the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, a variety of logging tools may be used to determine characteristics of the well. These characteristics may include parameters of the surrounding geological formation, the shape and texture of the wellbore, or the quality of cement installation behind a casing, to name a few. When logging data is obtained in the well, a downhole logging tool is moved through the well to obtain certain physical measurements. By processing these physical measurements, the characteristics of the well may be estimated. In the case of cement evaluation, for example, an acoustic logging tool may emit pulses of acoustic energy against a casing of the wellbore and measure the acoustic waveforms that return. Because the returning waveforms vary depending on the quality of the cement installation behind the casing—varying, for example, on whether the material behind the casing has acoustic properties more like a liquid, gas, or solid—the returning waveforms can be used to ascertain whether the material on the other side of the casing is a solid, and therefore likely to be properly installed cement. Other downhole tools may ascertain other well characteristics by, for example, emitting electromagnetic signals or radiation and detecting signals that return.

As mentioned above, acoustic measurements may sometimes include echo or reflection components originating from different layers and/or interfaces in the wellbore. This superposition of several reflections, referred to as galaxy patterns, may make it difficult to determine the measurements originating from the medium to be evaluated. In accordance with the present disclosure, embodiments include techniques for identifying or recognizing galaxy patterns, and fully or partially removing galaxy patterns including unwanted echoes reflected from interfaces which interfere with the acoustic measurement to be evaluated. In some embodiments, zones of galaxy patterns may be dynamically recognized and excluded from processing of the acoustic measurements.

With this in mind, FIG. 1 is a schematic diagram illustrating a system 10 for galaxy patterns in logging data obtained by a downhole tool 26 (e.g., an acoustic logging tool). In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations. The downhole tool 26 may be centered or eccentered, such that a measuring and/or detecting device (e.g., a transducer) of the downhole tool is positioned in a center of the downhole tool 26 or not in the center of the downhole tool 26.

As seen in FIG. 1, several casing joints 22 (also referred to below as casing 22) are coupled together by the casing collars 24 to stabilize the wellbore 16. The casing joints 22 represent lengths of pipe, which may be formed from steel or similar materials. In one example, the casing joints 22 each may be approximately 13 m or 40 ft long, and may include an externally threaded (male thread form) connection at each end. A corresponding internally threaded (female thread form) connection in the casing collars 24 may connect two nearby casing joints 22. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically-aggressive fluid.

The surface equipment 12 may carry out various well-logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. The acoustic logging tool 26 may be, for example, an UltraSonic Imager tool and/or an Isolation Scanner tool by Schlumberger Technology Corporation. The acoustic logging tool 26 may obtain measurements of acoustic impedance from ultrasonic waves and/or flexural attenuation. For instance, the acoustic logging tool 26 may obtain a pulse echo measurement that exploits the thickness mode (e.g., in the manner of an ultrasonic imaging tool) or may perform a pitch-catch measurement that exploits the flexural mode (e.g., in the manner of the Isolation Scanner). These measurements may be used as acoustic cement evaluation data to identify likely locations where solid, liquid, or gas is located in the annulus 20 behind the casing 22.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. The vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic cement evaluation data relating to the presence of solids, liquids, or gases behind the casing 22. For instance, the acoustic logging tool 26 may obtain measurements of acoustic impedance and/or flexural attenuation, which may be used to determine where the material behind the casing 22 is a solid (e.g., properly-set cement) or is not solid (e.g., is a liquid or a gas). When the acoustic logging tool 26 provides the measurements to the surface equipment 12 (e.g., through the cable 28), the surface equipment 12 may pass the measurements as acoustic cement evaluation data 36 to a data processing system 38 that includes one or more processor 40, one or more memory devices 42, storage 44, and/or a display 46. Further references to "the processor 40" are intended to include the one or more processors 40. In some embodiments, the processor 40 may include one or more microprocessors, one or more application specific processors (ASICs), one or more field programmable logic arrays (FPGAs), or any combination thereof. The processor 40 may execute instructions stored in the memory 42 and/or storage 44. As such, the memory 42 and/or the storage 44 of the data processing system 38 may be tangible, non-transitory, machine-readable media that store instructions executable by and data to be processed by the processor 40. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In other examples, the acoustic cement evaluation data 36 may be processed by a similar data processing system 38 at any other suitable location. The data processing system 38 may collect the acoustic cement evaluation data 36 and reduce galaxy patterns as taught in the present disclosure. After reducing the galaxy patterns, the data processing system 38 may determine whether such data 36 represents a solid, liquid, or gas using any suitable processing (e.g., T3 processing, *Traitement Très Tôt*, or Very Early Processing). One example of this processing technique is described in U.S. Pat. No. 5,216,638, "Method and Apparatus for the Acoustic Investigation of a Casing Cemented in a Borehole," which is assigned to Schlumberger Technology Corporation and is incorporated by reference herein in its entirety for all purposes.

In this way, the acoustic cement evaluation data 36 from the acoustic logging tool 26 may be used to determine whether cement of the annular fill 18 has been installed as expected. In some cases, the acoustic cement evaluation data 36 may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. For example, when the indicate the annular fill 18 has the generally liquid character as indicated at numeral 50, this may imply that the cement is either absent or was of the wrong type or consistency, and/or that fluid channels have formed in the cement of the annular fill 18. By processing the acoustic cement evaluation data 36 to reduce the galaxy patterns, ascertaining the character of the annular fill 18 may be more accurate and/or precise than comparable processing when the galaxy patterns remains in the acoustic cement evaluation data 36.

Figure 2A:
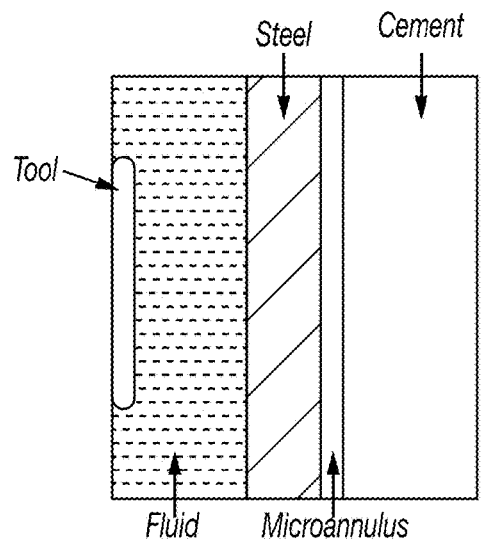
FIG. 2A is a schematic diagram of a cross-sectional view of a logging circumstance that may be encountered in accordance with an embodiment of the present disclosure.
Figure 2B:
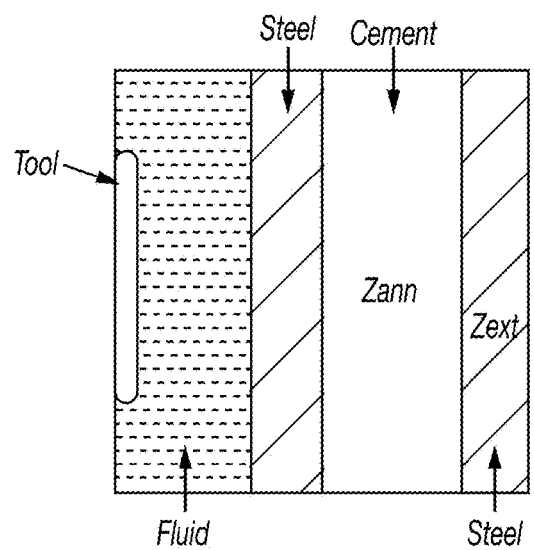
FIG. 2B is a schematic diagram of a cross-sectional view of another logging circumstance that may be encountered in accordance with an embodiment of the present disclosure.

One condition which may contribute to galaxy patterns and affect the accuracy of acoustic cement evaluation data is the presence of micro-annulus or third interface reflections from an outer casing or from the rock formation. As shown in FIG. 2A, the fluid micro-annulus between steel casing and cement may affect acoustic cement evaluation data. Further, a third interface echo behind the cement, which is another casing in FIG. 2B, may also affect acoustic data. In some situations, different layers of materials, such as cement or other fluid layers may also affect acoustic data.

Figure 3A:
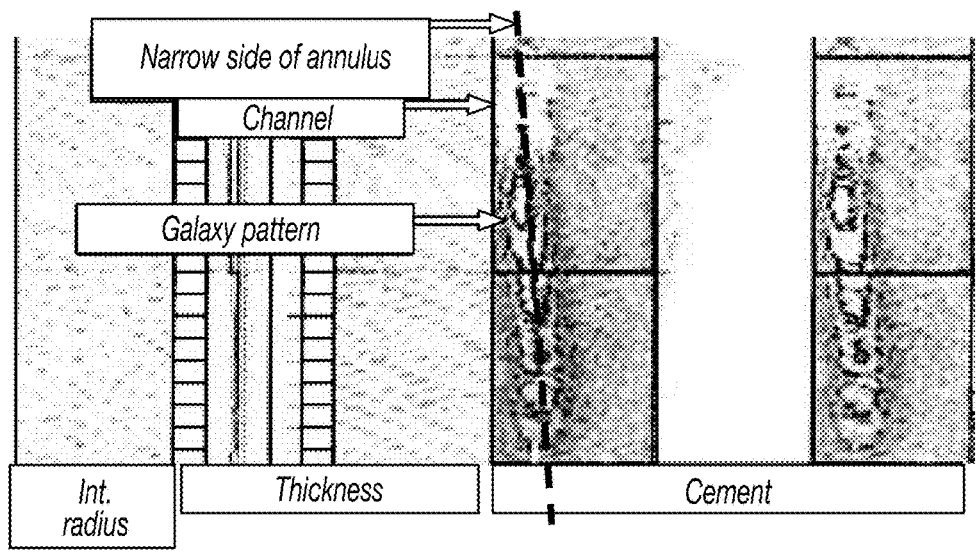
FIG. 3A is an example of data recorded by the logging tool in accordance with an embodiment of the present disclosure.
Figure 4:
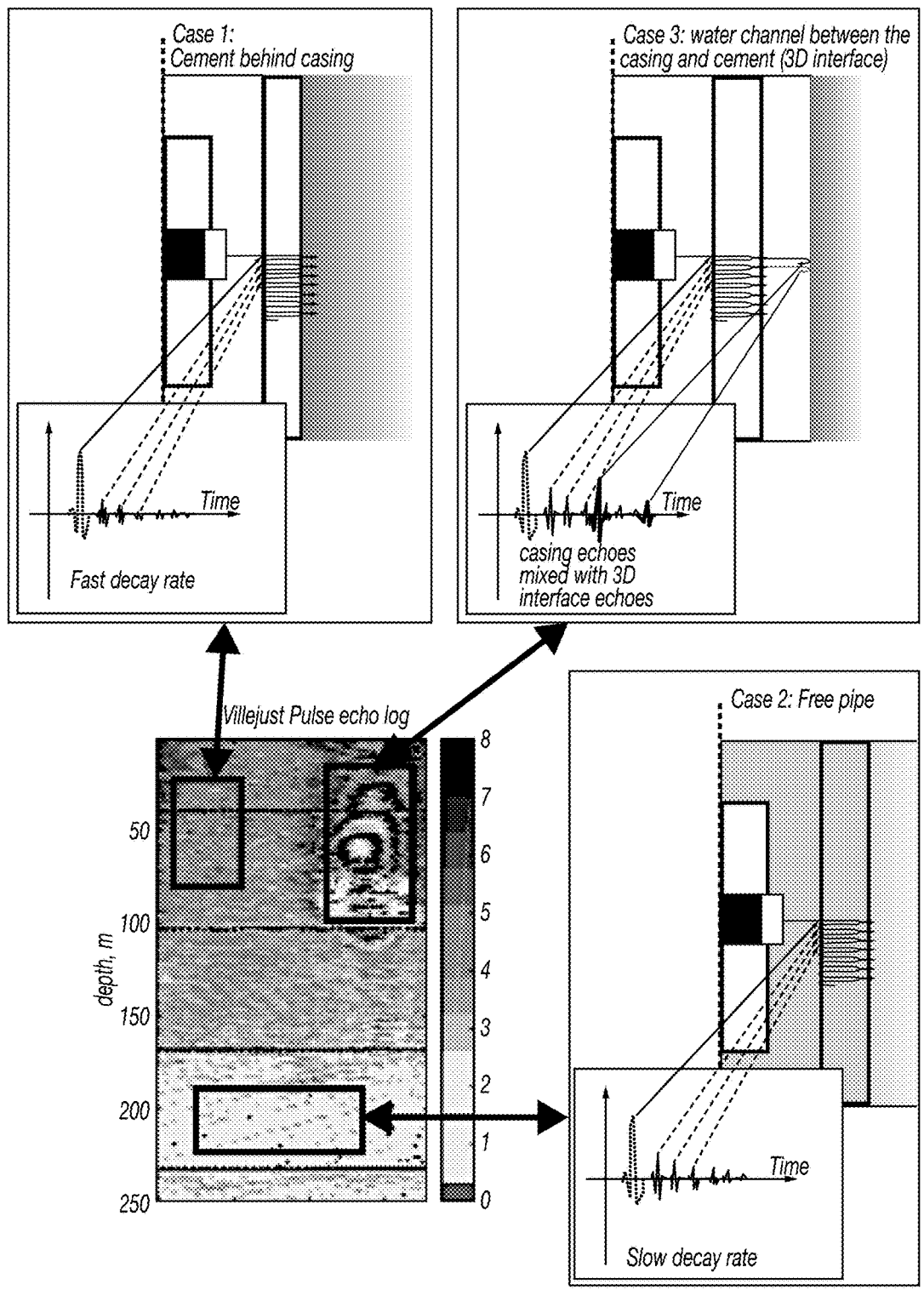
FIG. 4 is a schematic diagram illustrating an example of the interpretation of data recorded by the logging tool in accordance with a further embodiment of the present disclosure.

In those situations the additional reflections from the third interface can interfere with the casing resonance features and bias the quality factor. As shown in FIG. 3A, a typical galaxy pattern created by interference between casing resonance and reflections from an outer casing indicate good cement except when the casing almost touches the formation in free pipe. FIG. 3B further shows galaxy patterns created by interference between the casing resonance and reflections from the outer casing (in the top image) and formation (in the bottom image). FIG. 3C shows galaxy patterns created by interference between casing resonance and third interface reflections. Another representation of the effect of galaxy patterns on acoustic data is shown in FIG. 4. As represented in FIG. 4, the decay rate of the consecutive echoes depends on the type of medium situated behind the casing (Slow decay rate for low impedance material (case 2, water) and fast for good cement (case 1)). When the medium behind the casing is layered, a complex pattern can be observed with echoes coming from the various layer interface. On acoustic data logs the typical signature of this effect is a galaxy pattern. In the presented log example this pattern is seen in case 3.

As represented by FIGS. 3 and 4, the interpretation of acoustic data may be difficult in the presence of so-called galaxy patterns. Embodiments of the present technique involve recovering information about the acoustic impedance of the medium behind the casing in the presence of interference arising from the presence of an eccentered third interface.

The origin of the galaxy patterns may be described by suitable models. FIG. 5 shows an example of the effective acoustic impedance (Zin) measureable by a pulse-echo technique in the presence of a water-filled micro-annulus between casing and cement. The apparent acoustic impedance Zin of the cement varies as a function of micro-annulus thickness between a maximum value which is given by the cement acoustic impedance of Zcem=6 MRayl and a minimum value which is given by Zann2/Zcem=0.375 MRayl for this model, where the water's acoustic impedance in the annulus is Zann=1.5 MRayl. The pulse-echo measurement here assumes a firing pulse centered around FC=500 kHz. For a concentric cement interface relative to the casing interfaces, the resulting micro-annulus thickness is constant and a single value between Zin=0.375 MRayl and Zin=6 MRayl would be the result of the interpretation. Therefore the cement could appear to be fluid or even gas. Without independent information about the annulus thickness, it is difficult to determine the actual cement acoustic impedance or the nature of the medium between cement and casing.

The galaxy patterns, however, can be shown to arise in such a simple model if the effect of mutual eccentricity between the casing and the cement is included. This eccentricity leads to an annulus thickness which varies as a function of the azimuthal angle, as shown in FIGS. 6A and 6B, which are plots of annulus thickness and acoustic impedance with respect to azimuthal angle assuming an eccentered cement interface relative to the casing. In FIG. 6A, the annulus thickness varies as a function of azimuthal angle. Therefore an azimuthally scanning measurement sweeps through a domain of thicknesses and the effective acoustic impedance measurable by a pulse echo technique as in FIG. 6B.

Figure 7:
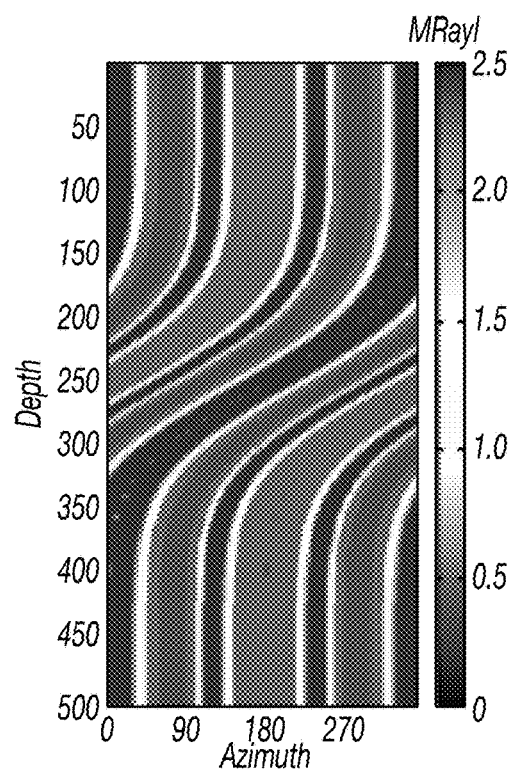
FIG. 7 is an exemplary image of an effective impedance measured by a logging tool, in accordance with an embodiment of the present disclosure.

Assuming that the direction of eccentricity varies smoothly as a function of logging depth, one may thus find a resulting image of effective acoustic impedance (Zin) measureable by a pulse-echo technique as in FIG. 7.

In some embodiments, the acoustic impedance distributions may be used in a log image with galaxy patterns (such as shown in FIG. 3, 4, or 7) and a forward model of effective acoustic impedance (Zin) to determine the acoustic impedance of the medium behind the casing. The assumption is that over a suitable range of depths, the only parameter subject to change is the annular thickness (through angle and amplitude of eccentricity) while the acoustic impedances of the media behind the casing remain nearly constant.

The angle and amplitude of eccentricity are considered to exhibit a statistical distribution in the range of depth, leading to domain of thicknesses $\Delta t$ which should be comparable to or larger than half of the peak separation tpp in FIG. 5 such that a sufficient range of effective impedance values appear in the image. The peak-to-peak separation in FIG. 5 is given to first order by tpp=vann/(2 FC) where vann is the annular velocity in the annulus and FC is the center frequency of the pulse-echo firing pulse. The domain of thicknesses $\Delta t \geq tpp/2$ can thus be varied with the experimental firing frequency FC, which is an obvious extension to the method.

Furthermore, in some embodiments, the method does not depend on a particular forward model of effective acoustic impedance. The number of adjustable model parameters, however, increases with complexity of the model and may thus not be uniquely determined. A log image such as the example in FIG. 7 is characterized by certain modes Zmod of the distribution of effective acoustic impedance Zin versus azimuthal angle $\varphi$ and depth which are more likely than others for a sufficient domain of thicknesses $\Delta t$. Those modes may be formally derived from a suitable forward model by calculating a 'density of states' DOS of the acoustic impedance Zin versus azimuth $\varphi$: $DOS(Zin)=\partial \varphi / \partial Zin$.

Figure 8:
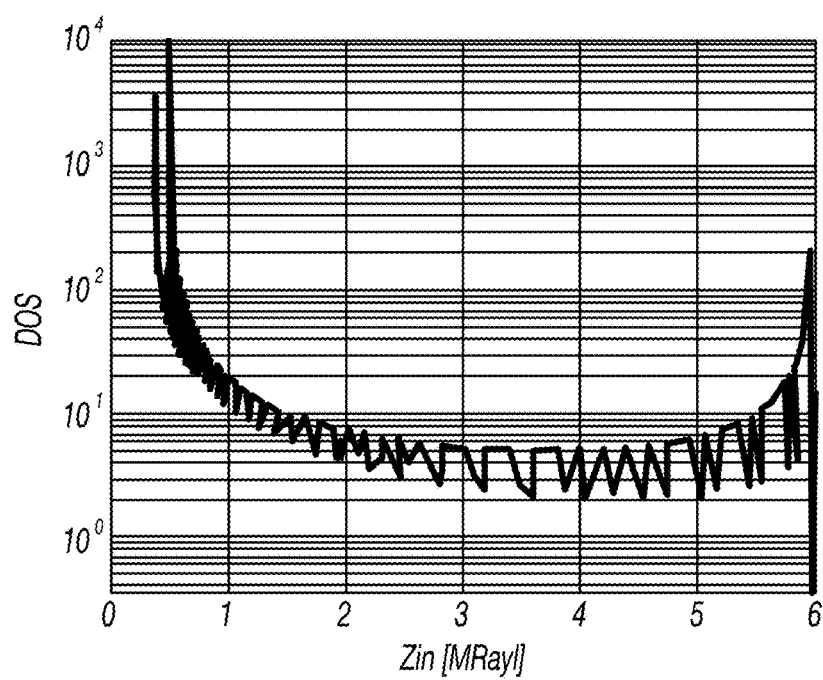
FIG. 8 is a plot of a density of states (DOS) on a logarithmic scale as a function of an acoustic impedance, in accordance with an embodiment of the present disclosure.

The quantity DOS(Zin) diverges at maxima and minima of the distribution Zin($\varphi$) shown in FIG. 6, as shown in FIG. 8, where the density of states on a logarithmic scale is associated with the model of FIGS. 6 and 7.

A set of three modes are easily identifiable at Zmod={0.375, 0.49, 6} MRayl. These values correspond to the extrema in FIG. 7 at $\varphi$={0°, 76°, 120°, 180°, 240°, 284°} where the DOS(Zin) diverges.

Figure 9:
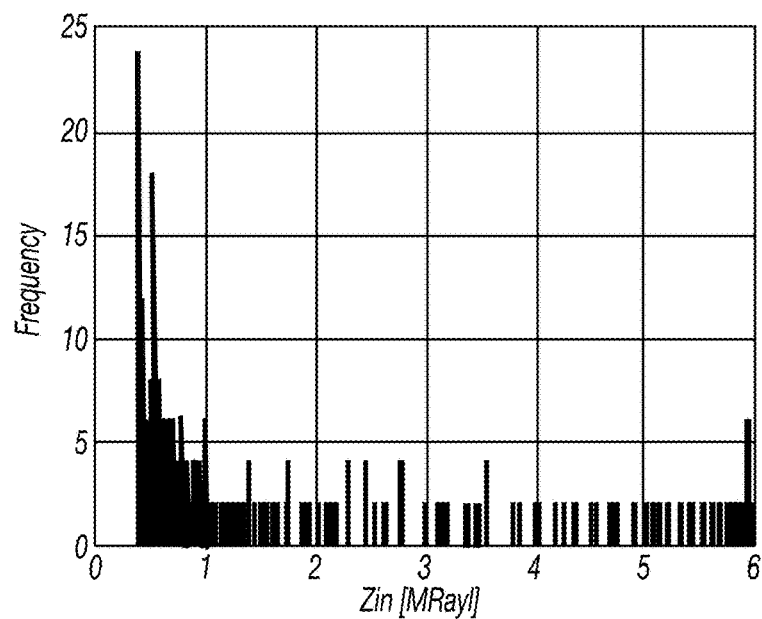
FIG. 9 is an exemplary histogram of an impedance, in accordance with an embodiment of the present disclosure.

Taking the log image such as in FIG>. 7 as input, a simple histogram hist(Zin) of impedances produces a measurement-based DOS(Zin) representation as shown in FIG. 9. The method presented here involves thus matching the 'density of states' DOS(Zin) of acoustic impedance provided by a suitable forward model with the modes in the histograms of an acoustic impedance well-log. The method of matching the two distributions can be performed by a minimization algorithm. The objective of the minimization algorithm is to find the closest correspondence between the measurements represented by a vector of hist(Zin) and a model-based vectorial prediction function of 'density of states' DOS(Zin) by an appropriate choice of the model parameters {Pi}, as represented in the equation below $$\text{Min}(Pi)\|[\text{hist}(Zin1),\text{hist}(Zin2),\text{hist}(Zinn)]-[\text{DOS}(Zin1),\text{DOS}(Zin2),\text{DOS}(Zinn)]\|2<\varepsilon,$$

where $\varepsilon>0$ is a sufficiently small value of tolerance. The minimization algorithm may be any suitable minimization algorithm.

Alternatively the objective of the minimization algorithm is to find the closest correspondence between the measurements represented by a vector of the set of modes Zmod in the histograms of an acoustic impedance well-log and a vector of DOS(Zin) peak-locations derived by the model.

The forward model parameter set {Pi} to be varied in the minimization algorithm is primarily the acoustic impedance of the annulus medium Zann and that of the medium behind the annulus Zext (cement, casing or formation) as shown in FIG. 2. The annulus thickness domain Δt and eccentricity amplitude or direction are neither required nor determined explicitly by the method, which only assumes that the distribution condition Δt≥tpp/2=vann/(4 FC) is respected. This may influence the range of depths to be considered in each application: If the depth range increases, then the distribution of thicknesses Δt increases which is favorable for identifying all possible modes Zmod. On the other hand, the assumption of nearly constant model parameters {Pi}={Zann, Zext} is less likely to be respected with increasing depth range. Therefore, the minimization algorithm may require varying the depth range.

Figure 10:
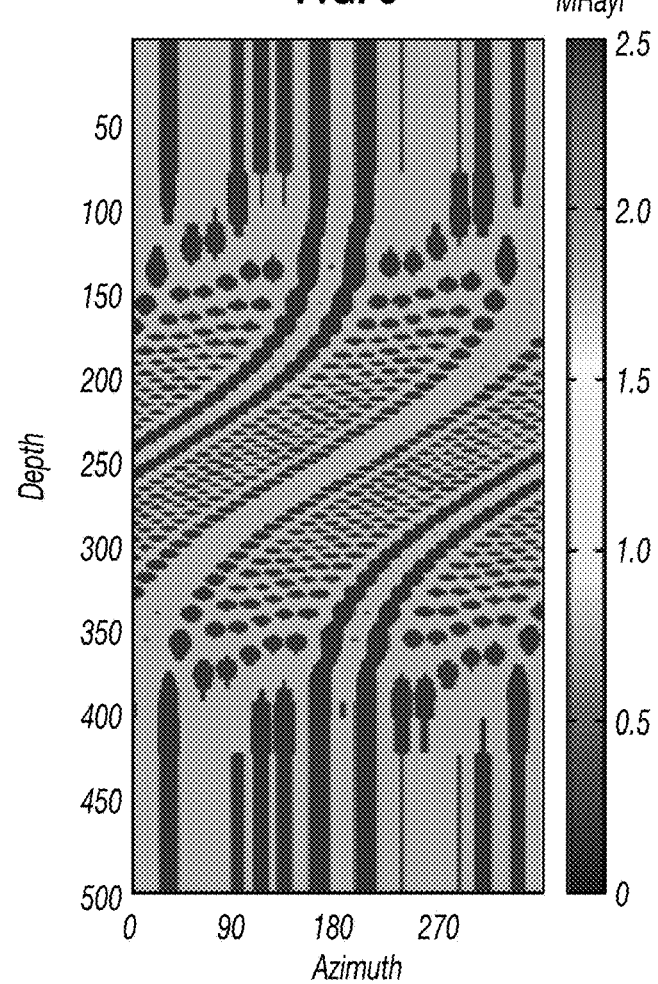
FIG. 10 is an exemplary image simulated in accordance with an embodiment of the present disclosure.

There is no specific requirement on the complexity of the forward model. However, in models with more than the two parameters {Zann, Zext} the minimization may not result in a unique set of {Pi}. For illustration purposes, another third-interface scenario with a cement annulus inside two eccentered casings is shown in FIG. 10. In the range below Zin=6 MRayl, two modes are identified in the log image histogram, Zmod={0.78, 1.9} MRayl, which can be matched to a model DOS(Zin). In FIG. 10, the top galaxy pattern is a simulated acoustic impedance log assuming an annulus of thickness around 8.83 mm due to an eccentered outer casing with respect to the inner casing. FIG. 11A shows a graph of density of states on a linear scale associated with the forward model of the simulated log in FIG. 10. FIG. 11B shows a histogram of acoustic impedance in states obtained from the simulated log of FIG. 10.

Another embodiment of removing galaxy patterns involves evaluating the impedance mismatch between acoustic data from different layers in the wellbore. The acoustic evaluation of the cement job quality using the Pulse-echo method implemented in the USI tool consist in the evaluation of the impedance mismatch between the layers to either side of the second interface (casing—cement). The higher the mismatch the stronger the received echo/reflection. Thus, for a well bonded heavy cement the attenuation is high (small mismatch) and for liquid present behind the casing the attenuation is low (high mismatch), as represented in FIG. 12. The top graph in FIG. 12 is an example of a waveform polluted by a third interface. Specular and main echo contributions are identified, as well as the third interface echo. The bottom graph shows the corresponding group delay notch in the presence of a third interface and without it. The spectrum is shaped to have a Gaussian form centered on the resonant frequency ±10%. GD and amplitude are flattened outside f_res±10% region. In the presence of an additional layer behind the second interface, the situation becomes more complex. The main echo, coming from the second interface is overlaid with an additional echo originating from a reflection from the third interface. An example of the 3rd interface echo contribution is shown in FIG. 12. By observing the Group Delay (GD) bottom plot, one sees that its shape is completely distorted. Therefore, the resulting inversion output is expected to be biased. From the time waveform one sees that the 3rd interface contribution appears at later times in the waveform, starting approximately around the 6th echo.

Figure 13:
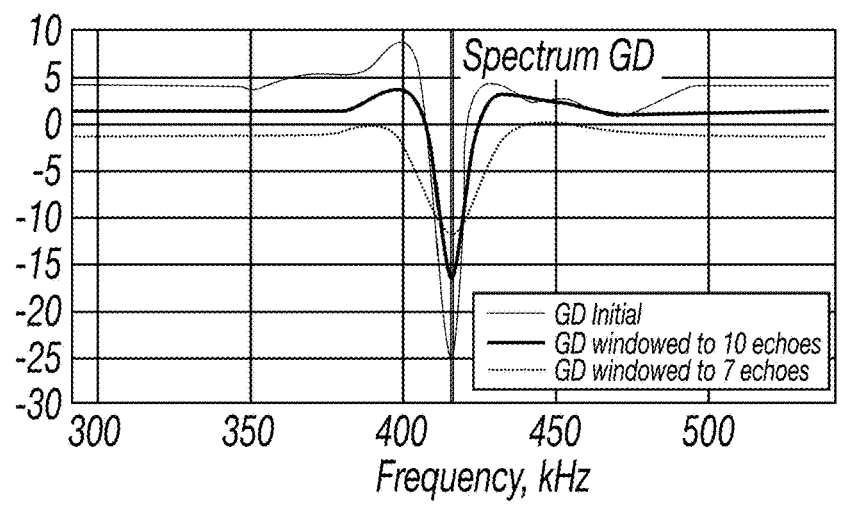
FIG. 13 is an exemplary graph representing a time window effect, in accordance with an embodiment of the present disclosure.

Typically, for cement evaluation a processing time window is selected (i.e. the time interval over which the decay rate is determined and the impedance mismatch is estimated). As a rule of thumb, the longer the time window, the better the fit. However, if this time window is short, one expects less contribution of the 3rd interface into the waveform spectrum and the GD will be less distorted. An example of the choice of a time window is presented in FIG. 13. Typically, this time window remains fixed for the processing of a given section of a log. FIG. 13 is a graph representing the time window effect. By multiplying the initial waveform by a time window (for example Tukey window as used in T3 [1]) one reduces the ripple effect caused by 3rd interface contributions at the cost of shortening the processed signal content which increases the noise on a log.

The selection criteria applicable to the Pulse Echo waveforms before processing are chosen by considering for following two contradictory aspects. First, the time window should be as long as possible to improve the inversion precision and minimize its bias. Second, longer time windows increase the likelihood of 3rd interface (and other noises') contributions. Conversely, usage of a shorter processing time windows applied to the raw waveform minimizes the bias/likelihood induced by 3rd interface reflections.

In accordance with the present techniques, these aspects may be combined to obtain an a final inversion workflow. In one or more embodiments, a third interface echo is seen as additional ripples added on top of the main spectrum, affecting both group delay and amplitude. A workflow for removing third interface echo and/or galaxy patterns includes initial windowing in the time domain to remove the eventual arrival of second specular echoes. Then, the workflow involves specular normalization and conversion to the frequency domain. The specular spectrum is estimated and the spectrum of the initial waveform is divided by the specular spectrum. The workflow then removes spectral noise outside the region of interest. All the structure of the group delay outside a narrow region in a vicinity of the fundamental resonance is removed and replaced by a constant value estimated by a median method. The same procedure is applied to the normalized amplitude. This is necessary to remove ripples in the spectrum introduced by 3rd interface reflections and other parasitic echoes (for example those originated from within the transducer, e.g. radial modes, backing noise, etc.). Furthermore, this simplifies the shape of the waveform in the time domain.

The workflow also involves spectral shaping and conversion to the time domain. At this point, the spectrum is shaped to a narrow band around the resonance frequency (typically a Gaussian but not limited to such a shape). In a final step the signal is converted back to the time domain. As a result, renormalized waveforms with echoes coming predominantly from the 2nd interface have a simple exponential decay. In contrast, in regions where the decay significantly deviates from an exponential decay rate are likely contaminated by 3rd interface reflection and these region can be flagged as such.

The workflow then involves subtraction of specular and second interface echoes in the time domain to enhance 3rd interface echo (TIE) identification. The estimated time-domain signal based on steps 1-4 can now be subtracted from the input waveform. This results in a residual estimated TIE waveform, if such an interface is detectable. The peak amplitude of this residual estimated TIE waveform relative to the specular amplitude is used to flag the TIE (see 4), the arrival time of the peak amplitude of the residual estimated TIE waveform is used to characterize the 3rd interface geometry (diameter and eccentricity).

In some embodiments, the third interface may be removed dynamically. Such techniques are summarized in the points below:

Map combination: As a result of this procedure it is possible to conceive a map showing the time of arrivals of the 3rd interface reflections. If one has two inversion results, obtained by processing waveforms with two different window lengths (e.g. 5 & 10 echoes) it would be possible to combine both to obtain a better final answer. One searches the places, there both maps are not affected by the 3rd interface and one estimates how both answers are different in those places. A transformation (for example linear) is then applied to the short-window-processed-map to remove this bias. Through this one arrives at a map which is less affected by 3rd interface reflections and corrected without a bias induced by the reduction of time window.

Dynamic processing window: Every waveform to be analyzed is processed with the corresponding time window estimated from the above described inversion principle, which length is dynamically adjusted to avoid 3rd interface interferences.

3rd interface removal: Instead of adjusting time processing window one may suggest that the influence of the 3rd interface is estimated and then removed from the waveform. The processing window remains constant.

Specular and 2nd interface removal in the time-domain: After removing the calculated specular and 2nd interface echoes in the time domain, the analysis of the residual TIE is simplified. Referring back to FIG. 4, the TIE signals are thus separated from the rest of the waveform. This processing is an improvement of the conventional 'TIE picking' algorithms which have to empirically separate TIE amplitudes and specular amplitudes.

Figure 14:
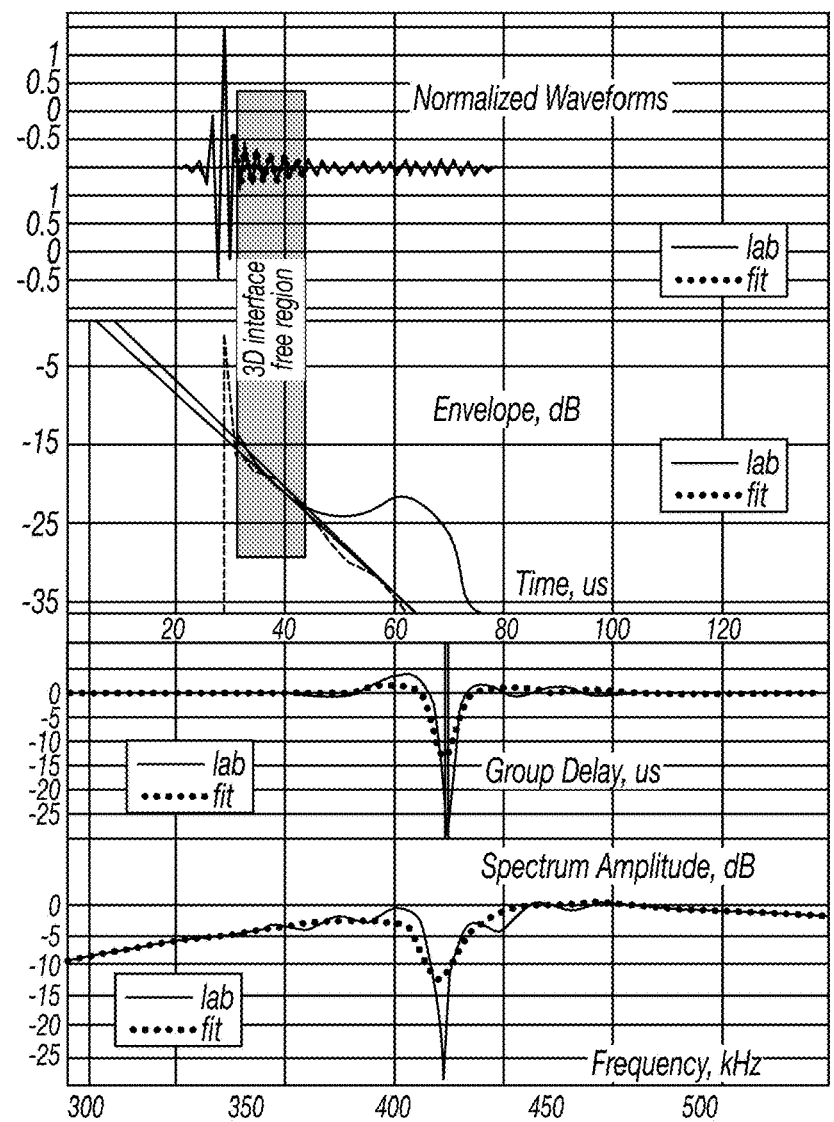
FIG. 14 is a graph illustrating an exemplary workflow in accordance with an embodiment of the present disclosure.

An example of this technique is depicted in FIG. 14.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of determining properties of a wellbore in a formation, the wellbore comprising a casing and an annular fill material between the casing and the formation and mud between the casing and an acoustic logging tool, the method comprising:
   obtaining from the acoustic logging tool, acoustic data comprising an acoustic wave reflected from the casing, the annular fill material, one or more interfaces between any of the mud, the casing, and the annular fill material, or combinations thereof;
   determining an initial time domain window and applying the time domain window to the acoustic wave in order to obtain a time-framed acoustic wave,
   normalizing the time-framed acoustic wave in a frequency domain, resulting in a specular spectrum;
   removing spectral noise outside a region of interest in the specular spectrum;
   shaping the specular spectrum to a narrow band around a resonance frequency;
   converting the shaped specular spectrum into a time domain, resulting in a renormalized waveform; and
   determining the type of the annular fill based on the renormalized waveforms, wherein the type is one of the following : liquid, solid or gas.

2. The method of claim 1, wherein the acoustic logging tool comprises a transducer that is configured to emit a sonic pulse.

3. The method of claim 1, wherein the acoustic logging tool comprises a transducer that is configured to emit an ultrasonic pulse.

4. The method of claim 1, wherein the spectral noise comprises parasitic echoes originating from the wellbore, the acoustic logging tool, or combinations thereof.

5. The method of claim 1, wherein the method is performed dynamically.

6. The method of claim 1, further comprising dynamically adjusting the window to reduce third interface interferences.

7. The method of claim 1, also comprising the following:
   subtracting from the input waveform the renormalized waveform, resulting in a residual third interface echo waveform, wherein the third interface echo is a signal obtained from an acoustic wave reflected at a third interface situated outside of the casing,
   characterizing the third interface geometry based on the third interface echo waveform.

8. The method of claim 7, wherein the third interface is a surface of the formation or of an outer casing.

9. The method of claim 1, wherein the narrow band is a Gaussian.

10. A non-transitory computer-readable medium storing computer-executable instructions, that when executed by at least one processor, causes the at least one processor to perform the following:
    obtaining from an acoustic logging tool, acoustic data comprising an acoustic wave reflected from a wellbore;
    determining an initial time domain window and applying the time domain window to the acoustic wave in order to obtain a time-framed acoustic wave,
    normalizing the time-framed acoustic wave in a frequency domain, resulting in a specular spectrum;
    removing spectral noise outside a region of interest in the specular spectrum;
    shaping the specular spectrum to a narrow band around a resonance frequency;
    converting the shaped specular spectrum into a time domain, resulting in a renormalized waveform; and
    determining the type of the annular fill based on the renormalized waveforms, wherein the type is one of the following : liquid, solid or gas.

11. The non-transitory computer-readable medium of claim 10, further storing computer-executable instructions to cause the at least one processor perform the computer-executable instructions dynamically.

12. The non-transitory computer-readable medium of claim 10, wherein the acoustic logging tool emits a sonic pulse.

13. The non-transitory computer-readable medium of claim 10, wherein the acoustic logging tool emits an ultrasonic pulse.

14. The non-transitory computer-readable medium of claim 10, wherein the spectral noise comprises parasitic echoes originating from the wellbore, the acoustic logging tool, or combinations thereof.

15. The non-transitory computer-readable medium of claim 10, further storing computer-executable instructions to dynamically adjust the window to reduce third interface interferences.

16. A system comprising:
an acoustic logging tool for obtaining acoustic data from a wellbore in a formation, the wellbore comprising a casing and an annular fill material between the casing and the formation and mud between the casing and the acoustic logging tool;
a processor that is configured to:
receive the acoustic data from the acoustic logging tool, said acoustic data comprising an acoustic wave reflected from the casing, the annular fill material, one or more interfaces between any of the mud, the casing, and the annular fill material, or combinations thereof;
determine an initial time domain window and applying the time domain window to the acoustic wave in order to obtain a time-framed acoustic wave,
normalize the time-framed acoustic wave in a frequency domain, resulting in a specular spectrum;
remove spectral noise outside a region of interest in the specular spectrum;
shape the specular spectrum to a narrow band around a resonance frequency;
convert the shaped specular spectrum into a time domain, resulting in a renormalized waveform; and
determine the type of the annular fill based on the renormalized waveforms, wherein the type is one of the following: liquid, solid or gas.

17. The system claim 16, wherein the acoustic logging tool emits a sonic pulse or an ultrasonic pulse.

18. The system claim 16, wherein the spectral noise comprises parasitic echoes originating from the wellbore, the acoustic logging tool, or combinations thereof.

19. The system claim 16, wherein the processor is further configured to dynamically adjust the window to reduce third interface interferences.

* * * * *